June 22, 1948. J. W. CHILDS 2,443,849
HEATED WINDSHIELD WIPER
Filed Aug. 13, 1945
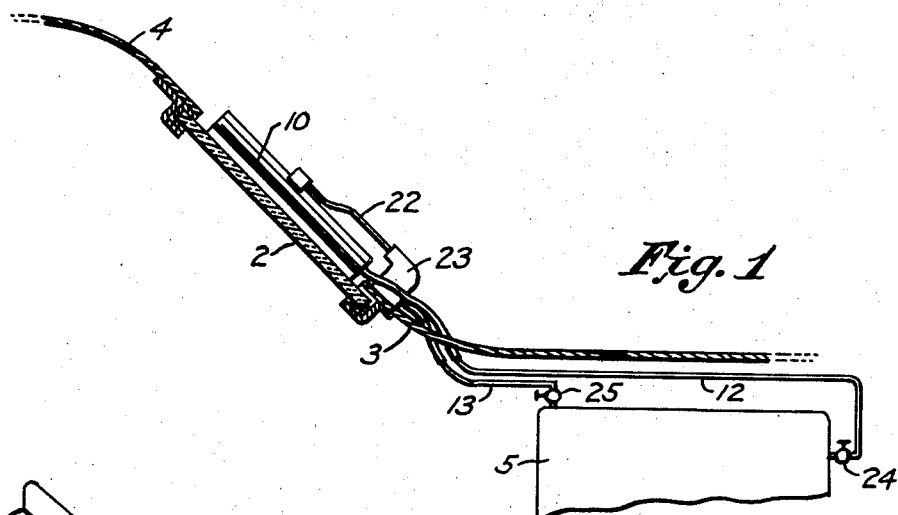
Fig. 1
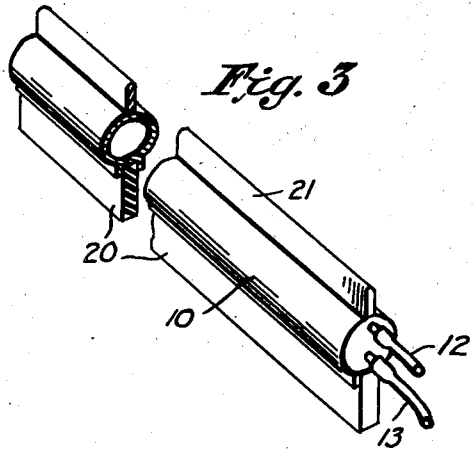
Fig. 3
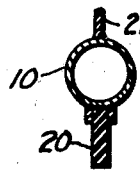
Fig. 4
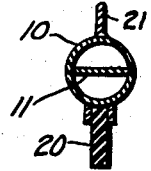
Fig. 5
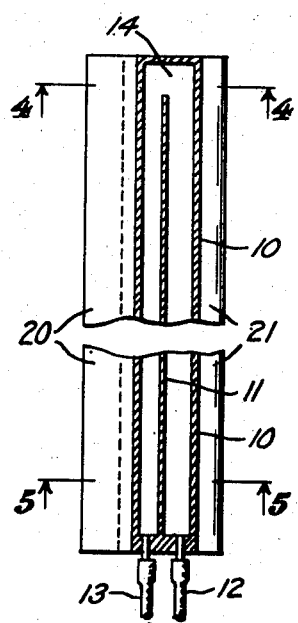
Fig. 2
Inventor
James W. Childs
By
Attorney Patented June 22, 1948

2,443,849

UNITED STATES PATENT OFFICE 2,443,849

HEATED WINDSHIELD WIPER

James W. Childs, Chester, Pa.

Application August 13, 1945, Serial No. 610,471

5 Claims. (Cl. 15—250.5)

This invention relates to windshield wipers for automobile and similar vehicles, and more particularly to a wiper which is capable of being heated, the invention having for its object to provide a construction which is simple in parts, less costly to manufacture, and more efficient in operation, than those heretofore proposed.

With these and other objects in view the invention resides in the novel details of construction and combinations of parts as will be disclosed more fully hereinafter and particularly covered by the claims.

Referring to the accompanying drawings constituting a part of this specification and in which like numerals designate like parts in all the views—

Fig. 1 is a general vertical sectional view, somewhat diagrammatic in form, illustrating the application of this invention to an automobile;

Fig. 2 is a longitudinal sectional view of a wiper made in accordance with this invention;

Fig. 3 is a perspective view with parts broken away to illustrate the general appearance of the wiper;

Fig. 4 is a transverse sectional view taken as on the line 4—4 of Fig. 2 and looking in the direction of the arrows; and Fig. 5 is a transverse sectional view taken as on the line 5—5 of Fig. 2 and looking in the direction of the arrows.

It has been proposed heretofore to heat windshield wipers, but usually the heating medium has been permitted to escape through perforations in the wiper and/or the wiper mounting, so as to be ejected directly onto the surface of the windshield principally for the avowed purpose of melting snow and/or ice that has formed or is forming upon the windshield surface. In such constructions, the heating medium immediately becomes lost and in most all cases the device has not been practical nor efficient since it aggravates, if not materially adds to, the condition that it is intended to remedy, particularly as and when the vehicle is in motion and subject to rapid exchange of heat between the windshield surface and the outside atmosphere.

The present invention, therefore, is directed primarily to the overcoming of such a condition and this is done, in the broadest aspect of the invention, by creating a closed circuit for the heating medium whereby the medium is not lost but is retained and recirculated through the wiper, to the end that said wiper may be said to maintain a fairly constant temperature, and this temperature may be governed by the temperature of the engine, whereby at higher speeds of travel the temperature of the heating medium is increased and thus meets, in a compensating manner, the increase in heat transfer (or heat loss) between the windshield surface and the surrounding atmosphere.

More specifically and referring to the accompanying drawings as one embodiment of the invention, the usual glass windshield is indicated by the numeral 2 mounted between the cowl 3 and the top 4 of an automobile or similar vehicle, the engine being diagrammatically illustrated at 5, though it will be understood that the source of heat for the heating medium may be other than the water jacket of the engine cylinders, i. e. the heating medium may be taken from the automobile radiator, from an automobile heater, or from a totally independent source of heat. When it is taken from the engine cooling circuit, it is preferably abstracted from the pressure side due to the fact that the wiper is mounted at a position above the highest point of the engine cooling circuit.

The windshield wiper comprises a tubular member 10 which may or may not be divided longitudinally by a partition such as indicated at 11, said partition forming two compartments, each compartment connected as by the inlet conduit 12 and the outlet conduit 13 to the source of the heating medium, the partition 11 being capable of passing the medium through the wiper from the one compartment to the other. This may be done by terminating the partition short of one end of the chamber 10 so that the medium passes around the end of the partition in the space indicated by the numeral 14, or the partition may be continuous throughout the length of the chamber but provided with one or more openings at the far end thereof so that the medium is compelled to pass substantially throughout the length of the chamber.

If the wiper is connected to the pressure side of the engine cooling circuit, no partition will be necessary since the pressure will be sufficient to jet the heated medium (from the end of the inlet conduit) a distance sufficiently great within the chamber 10 to provide sufficient heat in said chamber to accomplish the desired result, and there will not be a short-circuiting of the medium directly from the inlet conduit to the outlet conduit with resultant loss of heating benefit to the chamber 10.

The wiper blade 20 may be secured in any convenient manner to the wall of the chamber 10, and there will be provided a suitable rib 21 by means of which the wiper may be connected as by the link 22 to the oscillatory motor 23 usually provided for movement of the wiper over the surface of the windshield. Valves such as 24 and 25 may be provided respectively in the inlet and outlet conduits.

It is obvious that those skilled in the art may vary the details of construction and arrangements of parts constituting the apparatus, as well as vary the steps and combinations of steps constituting the method, without departing from the spirit of this invention, wherefore it is desired not to be limited to the exact foregoing disclosure except as may be required by the claims.

What is claimed is:

1. A windshield wiper comprising a closed tubular chamber having a wiper thereon and provided with an inlet and an outlet for a heating medium, a partition within said chamber and disposed between the inlet and the outlet, said partition adapted to pass the heating medium from the inlet to the outlet, and a conduit connected with each of said inlet and said outlet, said conduits conveying the heating medium from a source of heat to said chamber and back to the source of heat.

2. A windshield wiper comprising a closed tubular chamber having a wiper thereon and provided at one end thereof with an inlet as well as an outlet for a fluid heating medium, and a conduit connected with each of said inlet and said outlet, said conduits conveying the heating medium from a source of heat to said chamber and back to the source of heat.

3. A windshield wiper comprising a closed tubular chamber having a wiper thereon and provided at one end thereof with an inlet and an outlet for a heating medium, a partition within said chamber and disposed between the inlet and the outlet, said partition adapted to pass the heating medium from the inlet to the outlet, and a conduit connected with each of said inlet and said outlet, said conduits conveying the heating medium from a source of heat to said chamber and back to the source of heat.

4. A windshield wiper comprising a closed tubular chamber having a wiper thereon and provided with a longitudinally extending partition dividing said chamber into an inlet portion and an outlet portion, and a conduit connected with each of said inlet portion and said outlet portion, said conduits conveying a heating medium from a source of heat to said chamber and back to the source of heat.

5. A windshield wiper comprising a closed bi-compartment mounting for the wiper-blade, the compartments thereof having fluid intercommunication, and a conduit leading outwardly from each compartment whereby a fluid heating medium may be conveyed from a source of heat serially through the compartments and back to the heat source by virtue of said conduits.

JAMES W. CHILDS.

REFERENCES CITED

The following references are of record in the file of this patent:

UNITED STATES PATENTS

| Number | Name | Date |
| --- | --- | --- |
| 1,843,828 | McNaught | Feb. 2, 1932 |
| 1,982,345 | Kirby | Nov. 27, 1934 |
| 2,056,776 | Evans et al. | Oct. 6, 1936 |
| 2,125,154 | Dillon | July 26, 1938 |
| 2,260,904 | Horton | Oct. 28, 1941 |
| 2,323,555 | Matthews | July 6, 1943 |

FOREIGN PATENTS

| Number | Country | Date |
| --- | --- | --- |
| 693,496 | Germany | July 11, 1940 |